United States Patent
Walsh et al.

(10) Patent No.: US 7,671,802 B2
(45) Date of Patent: Mar. 2, 2010

(54) ACTIVE PLAYER TRACKING

(75) Inventors: Peter M. Walsh, Bristol, CT (US);
Jeffrey W. Weisenburger, Hebron, CT (US); Kenneth Demers, West Hartford, CT (US); Anthony J. Bailey, Wallingford, CT (US); David L. Casamona, Southington, CT (US)

(73) Assignee: Disney Enterprises, Inc., Burbank, CA (US)

( * ) Notice: Subject to any disclaimer, the term of this patent is extended or adjusted under 35 U.S.C. 154(b) by 5 days.

(21) Appl. No.: 12/050,043

(22) Filed: Mar. 17, 2008

(65) Prior Publication Data
US 2009/0231198 A1 Sep. 17, 2009

(51) Int. Cl.
*G01S 3/02* (2006.01)
(52) U.S. Cl. ........................... 342/463; 342/450
(58) Field of Classification Search ............ 342/357.07, 342/450, 457, 463, 465, 464; 455/456.6, 455/457
See application file for complete search history.

(56) References Cited

U.S. PATENT DOCUMENTS

| | | | |
|---|---|---|---|
| 6,204,813 B1 | 3/2001 | Wadell et al. | |
| 6,958,677 B1 * | 10/2005 | Carter | 340/10.1 |
| 2003/0146871 A1 * | 8/2003 | Karr et al. | 342/457 |
| 2004/0032363 A1 * | 2/2004 | Schantz et al. | 342/127 |
| 2005/0093976 A1 * | 5/2005 | Valleriano et al. | 348/143 |
| 2009/0048044 A1 * | 2/2009 | Oleson et al. | 473/570 |

* cited by examiner

*Primary Examiner*—Dao L Phan

(57) ABSTRACT

Sports objects, such as players and their equipment, are tracked by receiving signals transmitted by tags attached to the sports objects, and triangulating the signals to estimate the locations of the sports objects. One feature that promotes good signal reception is the use of different groups of three or more receivers. Another such feature is the use of two or more transmitter tags attached to different portions of the sports object. Still another such feature is the use of Ultra-Wideband signals.

16 Claims, 5 Drawing Sheets

US 7,671,802 B2

ACTIVE PLAYER TRACKING

BACKGROUND

Objects can be located and tracked with a system that receives radio frequency (RF) signals transmitted by electronic tags attached to the objects. The tags are sometimes referred to as radio frequency identification (RFID) tags. By receiving and triangulating the RF signals, the system can determine the location of each tagged object and determine whether it has changed locations, i.e., it can track the object.

Such systems have been used to track various types of objects. However, the majority of such tracking systems are used to track objects that do not rapidly change location, such as file folders in an office environment, or medical equipment and patients in a hospital environment. Tracking objects that rapidly change location presents additional technical difficulties.

An example of such a known tracking system includes a number of spread-spectrum radio receivers placed at locations around a playing field that track tags attached to athletes such as football players. The system performs time-of-arrival (TOA) or relative signal level calculations upon the signals to estimate the locations from which the signals originated and thus the locations of the tagged players.

SUMMARY

Embodiments of the present invention relate to a system and method for tracking sports objects, such as players and their equipment, in essentially real time as they move about a playing area such as a football field, basketball court, hockey rink, etc. In an exemplary embodiment of the invention, the system includes a number of radio receivers distributed about the playing area in a manner that ensures every area of the field, court, etc., is covered, i.e., is within radio reception range, of at least three receivers. The receivers can receive signals transmitted by tags attached to the sports objects. In some embodiments of the invention, a sports object can have two or more transmitter tags attached to different portions of it, so that if a receiver is unable to detect signals from one tag due to signal blockage, degradation, multipath reflection, etc., the receiver may still be able to detect signals from another tag.

Groups of radio receivers that define subsets of the total number of radio receivers can be individually enabled or selected, so that if one group is unable to detect signals from a tag due to blockage, degradation, reflection, etc., another group may still be able to detect signals from the tag. There are preferably at least two such radio receiver groups (e.g., a "first group" and a "second group") in use to detect signals.

An estimator system, which can comprise any suitable circuitry, such as one or more processing systems for performing signal triangulation, data point collection, interpolation, extrapolation, averaging, etc., estimates a position of the sports object in response to the signals detected by one or more radio receiver groups. The estimator can repeatedly generate such estimates, so that the movement of the sports object in the playing area can be tracked.

Other embodiments are also provided. Other systems, methods, features, and advantages of the invention will be or become apparent to one with skill in the art to which the invention relates upon examination of the following figures and detailed description. It is intended that all such additional systems, methods, features, and advantages be included within this description, be within the scope of the invention, and be protected by the accompanying claims.

BRIEF DESCRIPTION OF THE FIGURES

The invention can be better understood with reference to the following figures.

The components within the figures are not necessarily to scale, emphasis instead being placed upon clearly illustrating the principles of the invention. Moreover, in the figures, like reference numerals designate corresponding elements throughout the different views.

DETAILED DESCRIPTION

Figure 1:
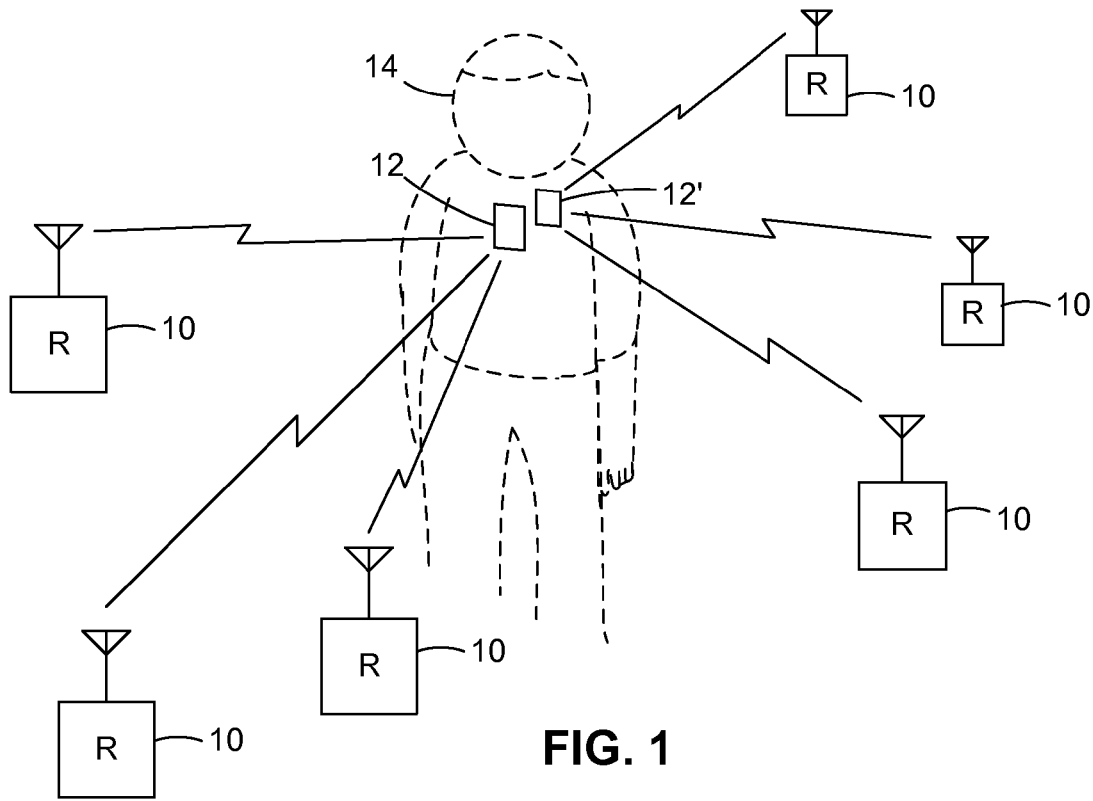
FIG. 1 illustrates two radio receivers receiving signals transmitted by two tags attached to a player's uniform, in accordance with an exemplary embodiment of the invention.

As illustrated in FIG. 1, in an illustrative or exemplary embodiment of the invention, a number of receivers 10 receive radio signals transmitted by one or more tags 12 in the manner described below. Tags 12 can have a shape and size similar to that of conventional radio frequency identification (RFID) tags, allowing them to be conveniently and unobtrusively attached to or carried in a sports object 14, such as a player's uniform, helmet or other personal equipment. Sports objects can also include mobile sports equipment such as balls, pucks, bicycles, skateboards, etc. A reference herein to a tag "attached to" a sports object is intended to include within its scope of meaning a tag attached to, mounted on, embedded in, carried in, formed on or in, or otherwise associated with the sports object. As described below in further detail, the received signals are used to estimate the location and thus track the movement of sports objects. For example, numerous players on a field can each have one or more attached tags, and the invention can allow personnel to track the location and movement of each individual player. For purposes of illustration, the following description relates to tracking only a single sports object 14, but in view of the description, persons skilled in the art to which the invention relates will readily be capable of extending the system and method to simultaneously track multiple sports objects.

Figure 2:
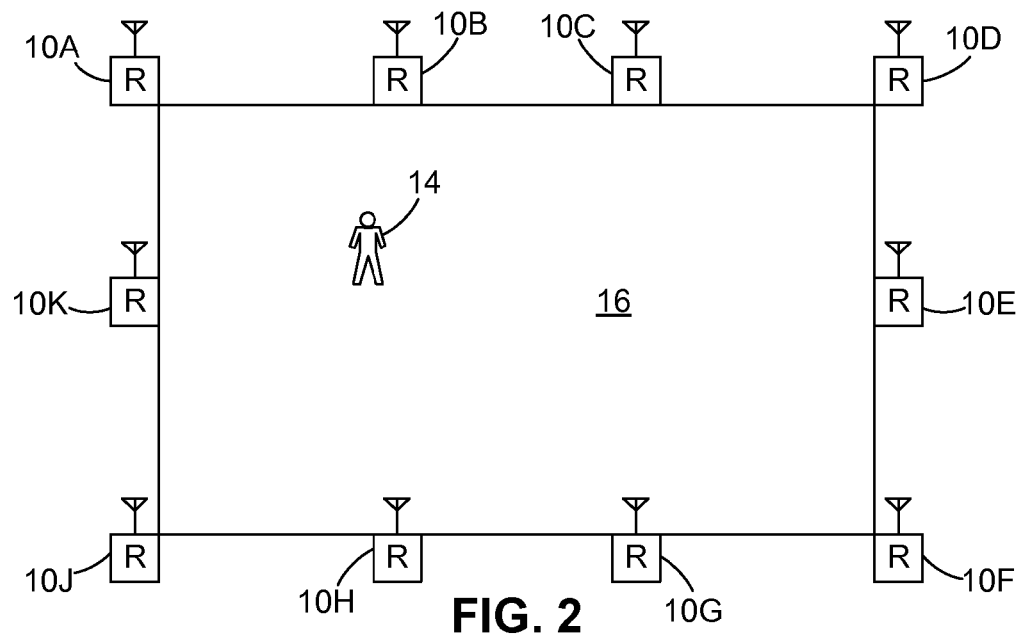
FIG. 2 is a diagram of a playing field with receivers of the type shown in FIG. 1 distributed about its periphery.

As illustrated in FIG. 2, a number of receivers 10 are distributed about the periphery of a playing area 16, such as a football field, basketball court, hockey rink, etc., in which sports object 14 can move. Receivers 10 can be distributed or otherwise arranged in any suitable manner on or in any suitable portion of playing area 16, but at least three (and more preferably, at least four) receivers 10 are within radio reception range of every location on playing area 16. In other words, regardless of where on playing area 16 the player or other sports object 14 moves, at least three receivers 10 are within sufficiently close range to ordinarily enable them to receive informational signals from attached tags 12. As described below, however, from time to time as sports object 14 moves about playing area 16, there may be instances in which signals from an attached tag 12 fail to be adequately received by any receiver 10 due to being blocked or reflected by some intervening object, such as the player's own body or equipment, or other players' bodies or equipment. As described below, the present invention can include one or more of several features that promote continued tracking even under such non-ideal conditions.

Figure 3:
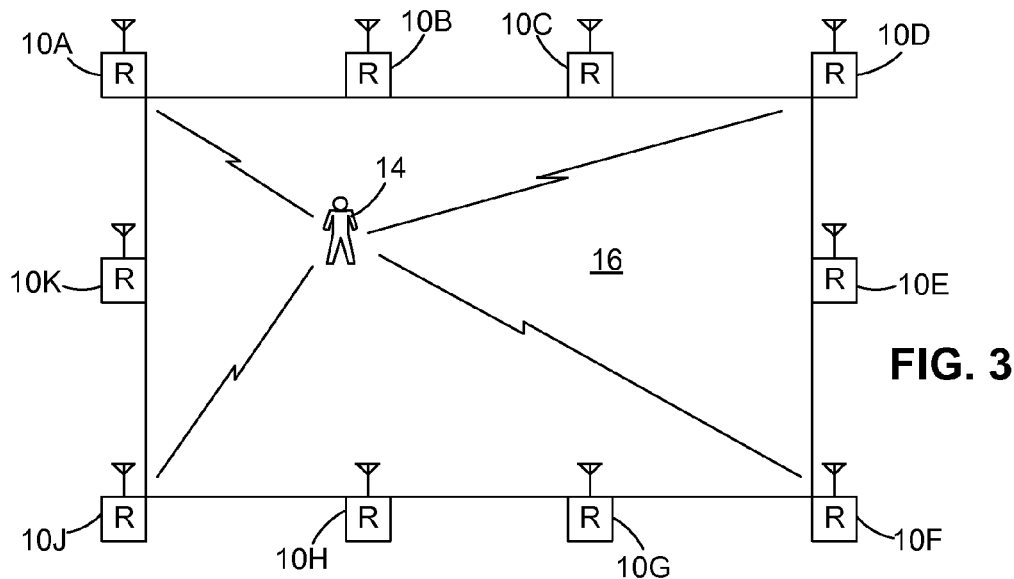
FIG. 3 is similar to FIG. 2, showing an exemplary first group of receivers receiving signals transmitted by one or more tags attached to a player's uniform.
Figure 4:
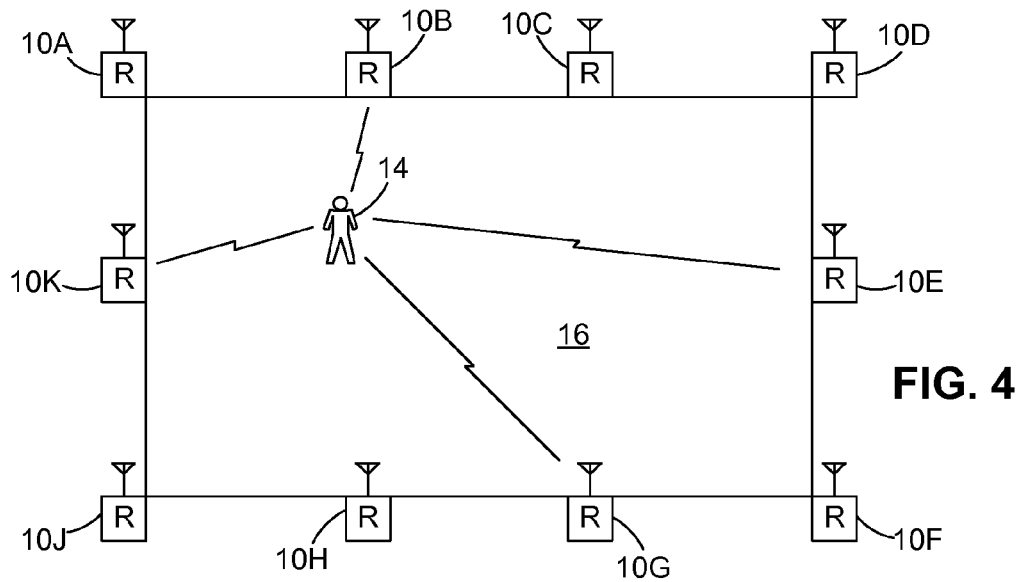
FIG. 4 is similar to FIG. 3, showing an exemplary second group of receivers receiving signals transmitted by one or more tags attached to a player's uniform.

As illustrated in FIGS. 3-4, one such feature that promotes tracking even when some transmitted signals may be blocked or degraded involves using two or more different groups of receivers 10 to receive signals. In the exemplary arrangement shown in FIGS. 3-4, a total of ten receivers 10A, 10B, 10C, 10D, 10E, 10F, 10G, 10H, 10J and 10K are spaced approximately equally apart from each other about the periphery of playing area 16. As illustrated in FIG. 3, the receivers 10 of a first receiver group, comprising in this example, four receivers 10A, 10D, 10F and 10J selected from among the ten receivers 10, have been selected to receive signals from one or more tags 12 attached to sports object 14. Similarly, FIG. 4 illustrates four other receivers 10B, 10E, 10G, and 10K selected from among the ten receivers 10, having been selected to receive signals from those tags 12. Each receiver group, comprising three or more (and more preferably, four or more) receivers 10, is thus a subset of the ten total receivers 10. The set of receivers 10 of each receiver group is different from the set of receivers 10 of all other receiver groups. Although FIGS. 3-4 show two receiver groups for purposes of illustration, there can be any suitable number of (two or more) receiver groups, each having any suitable number of (three or more) receivers. It should be noted that a receiver 10 can belong to more than one group. For example, still another receiver group can comprise receivers 10A, 10B, 10C, 10D and 10E, while yet another receiver group can comprise receivers, 10C, 10D, 10E, 10F and 10G, etc.

Another feature that promotes reliable tracking is the use of Ultra-Wideband (UWB) technology in receivers 10 and tags 12. As known in the art, UWB is a radio technology that has been found to be useful for short-range high-bandwidth communications, and has been used in radar imaging, precision positioning, and tracking systems. As UWB is primarily pulse-based, it performs well in systems in which time-of-flight is to be measured with high immunity to multipath reflection and fading. As UWB is well understood by persons skilled in the art, in view of the descriptions herein such persons will readily be capable of providing suitable UWB receivers 10 and corresponding UWB transmitter tags 12.

Figure 5:
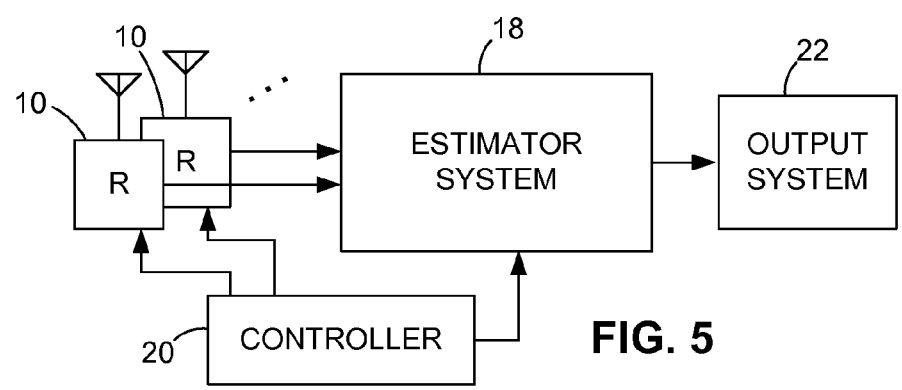
FIG. 5 is a block diagram of a system for tracking sports objects in a playing area.

As illustrated in FIG. 5, an exemplary system for tracking sports object 14 includes, in addition to receivers 10, an estimator system 18, a controller 20, and an output system 22. Only two receivers 10 are shown in FIG. 5 for purposes of clarity, with others indicated by the ellipsis (" . . . ") symbol.

Each receiver 10 outputs signals representative of the RF signals it receives from transmitter tags 12. These output signals are provided to estimator system 18, which, as described below, selects the receiver groups from which such signals are to be processed, under control of controller 20. Although in the exemplary embodiment controller 20 and estimator system 18 are shown as separate elements, in other embodiments they can be more integrated with one another or with other elements. They can comprise discrete circuitry or, alternatively or in addition, programmable processor systems, such as those based upon signal processors and microprocessors. They can be embodied in software elements operating on a programmed processor. Estimator system 18 generates estimates of the positions of sports objects 14. Output system 22 outputs this information to users. Output system 22 can include any suitable devices or systems, from a straightforward video display (not shown) in which icons represent the locations of sports object 14 relative to graphics representing playing area 16, to a media distribution system such as a system that conveys the information to users' wireless telephones, televisions, computers, or other remote devices.

Figure 6:
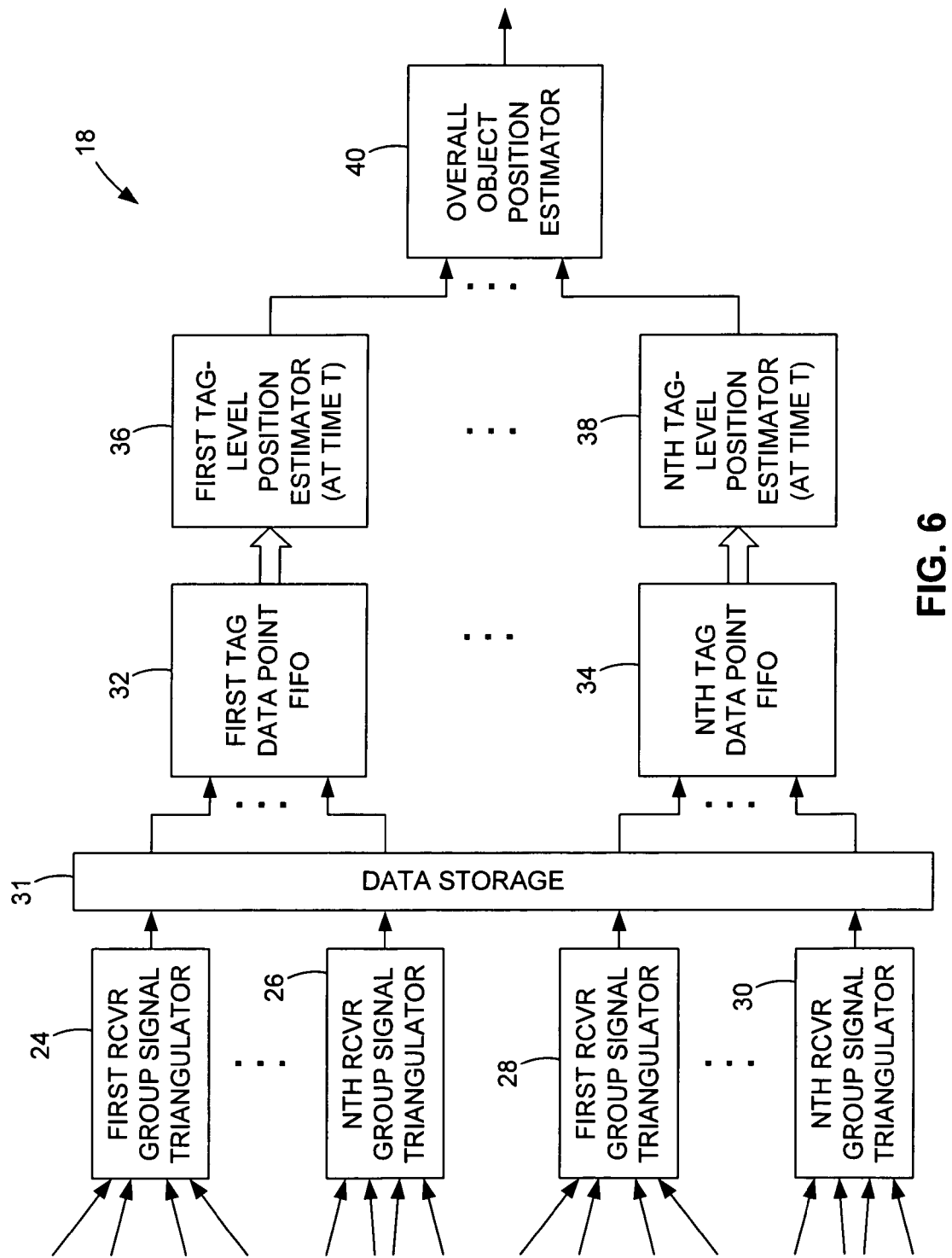
FIG. 6 is a block diagram of the estimator portion of the system of FIG. 5.

The exemplary estimator system 18 is shown in further detail in FIG. 6. Signal triangulators 24 through 26 correspondingly receive the outputs of receivers 10 of a first receiver group through Nth receiver group. (Other triangulators that measure and process signals received from other receiver groups (i.e., second, third, etc., up to the Nth) are not shown for purposes of clarity but are indicated by the ellipsis (" . . . ") symbol.) The receivers 10 of these receiver groups receive signals transmitted by a first tag 12 (FIG. 1) attached to sports object 14.

Signal triangulators 28 through 30 are similar to signal triangulators 24 through 26. Accordingly, they receive the outputs of receivers 10 of the above-referenced first receiver group through Nth receiver group. (Other triangulators that measure and process signals received from other receiver groups (i.e., second, third, etc., up to the Nth) are not shown for purposes of clarity but are indicated by the ellipsis (" . . . ") symbol.) The receivers 10 of these receiver groups receive signals transmitted by a second tag 12' (FIG. 1) attached to sports object 14.

Each of the illustrated signal triangulators 24, 26, 28 and 30 detects information indicating the presence of a transmission from tag 12 (or 12') in the signals received by receivers 10 of its corresponding receiver group, and triangulates the signals to generate an estimate of the location at a time (t) of the tag 12 (or 12') from which the signal was transmitted. In an embodiment in which each receiver group consists of four receivers 10, a triangulator only produces a location estimate if the information signal it receives from each of those receivers 10 can be detected. If the signal that the triangulator receives from one or more of those receivers 10 is too poor to detect (e.g., it was effectively blocked, reflected away, etc.), then that triangulator may not generate a location estimate at that time. As signal triangulation itself is well understood in the art, that aspect is not described in further detail herein. Also, as with other elements of estimator system 18, triangulators, 24, 26, 28, 30, etc., can be implemented in a programmed processor or similar integrated circuitry or system. For example, they can be embodied in one or more software routines operating on a programmed processor.

The location estimate includes at least X and Y coordinates (and can also, in some embodiments, include a Z or height coordinate), with respect to a suitable coordinate system defined for playing area 16. The location estimate defines or is included as part of a data point. A data point can further include one or more of: a group identifier, indicating to which receiver group the location estimate corresponds; a time stamp, indicating when the signal was detected; and a data quality indicator, indicating the signal strength or other quantity from which the reliability of the accuracy of the resulting location estimate can be gauged.

Estimator system 18 can further include a data storage subsystem 31, such as, for example, a magnetic disk drive-based system. Data storage subsystem 31 can act as an archive for all data points produced by signal triangulators 24, 26, etc. Data storage subsystem 31 may also act as a buffer for those data points, providing them to tag data point FTFOs 32 through 34. Whenever one of signal triangulators 24, 26, etc., outputs a data point, data storage subsystem 31 can store it.

In normal operational mode, where continuous tracking of a player or other sport object 14 is performed, data storage subsystem may act as a buffer, forwarding the data points as they are received to tag data point FTFOs (i.e., first-in-first-out storage elements) 32 through 34. (Other tag data point collectors that collect data points received from other triangulators are not shown for purposes of clarity but are indicated by the ellipsis (" . . . ") symbol.) As each data point is forwarded, it can be stored in the tag data point FIFO 32, 34, etc., associated with the one of signal triangulators 24, 26, etc., that produced it. Each such tag data point FTFO 32, 34, etc., is capable of storing up to a predetermined maximum number of data points, i.e., the FIFO size. Once the FTFO is full, as the tag data point collector receives each additional data point produced by an associated signal triangulator, the oldest data point in the FIFO is discarded or pushed out. As noted above with regard to elements of estimator system 18, tag data point FIFOs 32 through 34 can be embodied in any suitable hardware or software. For example, they can be embodied in one or more software routines operating on a programmed processor.

A first tag-level position estimator 36, described below in further detail, operates upon data points stored in the tag data point FIFO 32. A second tag-level position estimator 38, similarly described below in further detail, operates upon data points stored in the tag data point FIFO 34, and so forth. (Other tag-level position estimators that receive data points from other tag data point collectors (not shown) are not shown for purposes of clarity but are indicated by the ellipsis (" . . . ") symbol.) Lastly, an overall object position estimator 40 combines the tag-level estimates output by first and second tag-level position estimators 36 and 38 (and others that can be included but are not shown for purposes of clarity). As noted above with regard to elements of estimator system 18, tag-level position estimators 36 through 38 can be embodied in any suitable hardware or software.

Figure 7:
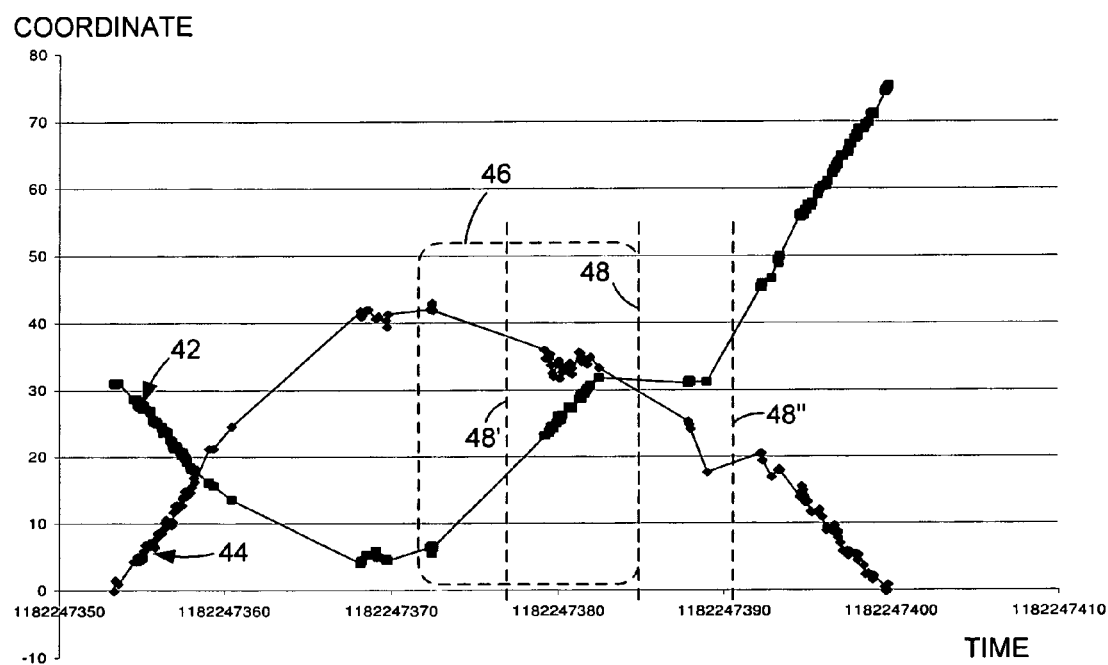
FIG. 7 is a graph, showing data points comprising an X and Y coordinates of an estimated sports object location plotted against time.

In FIG. 7, exemplary X and Y coordinates of data points produced by triangulators 24, 26, 28 and 30, etc., are shown plotted against time. (This plot is shown for purposes of illustrating data points, and estimator system 18 does not necessarily create such a plot.) The data points are represented in FIG. 7 by dark squares. An X coordinate sequence 42 is represented by a chain of line segments connecting successive data point X coordinates. A Y coordinate sequence 44 is similarly represented by a chain of line segments connecting successive data point Y coordinates. Thus, it can be seen from the exemplary plot of FIG. 7 how the X and Y coordinates of a player or other sports object 14 having an attached tag 12 can change as the player moves about playing area 16 (FIGS. 2-4).

The time-axis position at which each data point is plotted is that which is indicated by its time stamp. At any given time, each tag data point FIFO 32, 34, etc., can contain the predetermined number of data points. For example, in an embodiment in which the FIFO has a size capable of storing a maximum of fifty data points, the FIFO can have stored in it the exemplary collection 46 of fifty data points, i.e., fifty X coordinates, fifty Y coordinates, fifty time stamps, etc. The FIFO contents thus provide a moving window in time.

Each of tag-level position estimators 36, 38, etc., uses the data points that have been stored in the associated one of tag data point FTFOs 32, 34, etc., to generate a position estimate for sports object 14 at a selected time, such as, for example, any of times 48, 48' and 48" shown in FIG. 7. As described below, estimates of the position of sports object 14 can be made not only in real-time for its then-current position at time 48, but also for an earlier moment in time 48' or a later moment in time 48". Each tag-level position estimator can make such estimates at regular intervals, such as, for example, every $1/60^{th}$ of a second, or upon being instructed (e.g., by controller 20 in response to user input). The tag-level position estimator can use any suitable method for generating a position estimate. In the exemplary embodiment of the invention, the tag-level position estimator first performs outlier elimination, then fits the X and Y values of the data points to respective curves using analytic equations, and solves for the respective X and Y values at time 48. The analytic equations that are fit to the data can be, for example, simple affine functions of time (i.e., in the form $x=a*t+b$), which represent the case of motion at a constant velocity. The equations can be of any suitable form, including higher order representations. The equation type can be selected based upon the expected motion of the object. For another example, if the sports object is of a type that moves in three-dimensional space (e.g., a ball in flight), then the equation can be one that is known to model a body in motion subject to the force of gravity.

Tag-level position estimators 36, 38, etc., can use interpolation, extrapolation or other suitable methods of generating a position estimate for the times 48, 48', 48", etc., of interest. Kalman filtering or other predictive methods are also suitable. For example, with reference to FIG. 7, if at a given moment in time a tag-level position estimator 36, 38, etc., is to generate a position estimate (in real-time) for a time 48', i.e., earlier than that present moment in time, then it can interpolate between collected data points. Similarly, for example, if at a given moment in time a tag-level position estimator 36, 38, etc., is to generate a position estimate (in real-time) for a time 48", i.e., later than that present moment in time, then it can extrapolate beyond the collected data points to predict a future position.

In a normal operational mode, tag-level position estimators 36 through 38 generate successive position estimates as time 48 is incremented (e.g., every $1/60^{th}$ of a second), and the requisite data points are loaded into tag data point FTFOs 32 through 34, thereby enabling a user to track the movement of sports object 14 in a continuous manner. In other modes of operation, however, a collection of data points can be loaded from data storage subsystem 31 into tag data point FTFOs 32 through 34 in response to user input. That is, a user can (e.g., through a user interface (not shown) associated with controller 20) cause data storage subsystem 31 to retrieve data points associated with some user-selected time or times at which the user desires to know the location of sports object 14. Through such methods, various types of user queries can be addressed, such as how long it took for a player to run from one point on the playing field to another.

As the exemplary plot shown in FIG. 7 indicates, there may be times at which no data points can be collected because the information could not be detected from signals transmitted by a tag 12, due to poor signal quality, blockage (e.g., by the player's own body or other players' bodies), multipath reflection, or other undesirable conditions. In such an instance when a data point cannot be collected in response to signals transmitted by a first tag 12 attached to sports object 14, a data point may still be able to be collected in response to signals transmitted by a second tag 12' (see FIG. 1) attached to sports object 14. As described above, another feature that promotes reliable tracking relates to the use of multiple transmitter tags. Referring briefly to FIG. 1, note that a first tag 12 can be attached to one portion of sports object 14, such as to the front of a player's uniform, and a second tag 12' can be attached to a different portion of sports object 14, such as to the back of the player's uniform. Returning to FIG. 6, it should be correspondingly noted that there are two sets of elements: those that relate to signals received from first tag 12, and those that relate to signals received from second tag 12'. (As an embodiment of the invention can involve more than the two exemplary tags 12 and 12' attached to the same sports object, there can accordingly be more than two such sets of elements, but only those relating to signals received from two tags 12 and 12' are shown and described in FIG. 6 for purposes of clarity.) Accordingly, each of tag-level position estimators 36, 38, etc., can provide a position estimate in response to signals received from its corresponding tag 12 or 12', respectively, and overall object position estimator 40 can then combine the tag-level position estimates into an overall position estimate.

Although discrete elements are shown in FIG. 6 for purposes of illustration, persons skilled in the art can appreciate that in other embodiments of the invention some of these elements can be combined with one another or their functions performed by a more integrated element, such as a programmable processor system comprising one or more microprocessors, signal processors, memories, etc. For example, instead of performing operations in parallel, as the illustrated triangulators 24, 26, 28 and 30, tag data FIFOs 32 and 34, and tag-level position estimators 36 and 38 suggest, a more integrated element can be provided to receive, measure, and otherwise process signals from the various receivers 10 in a time-multiplexed fashion.

Overall object position estimator 40 can combine tag-level position estimates in any suitable manner, such as by computing an average. That is, it can compute an average of all X coordinates and an average of all Y coordinates. In combining the data points, estimator 40 can take into account how long ago a data point was collected and discard tag-level position estimates derived from data points that are older than some predetermined age threshold. Transmissions from a certain tag may not result in generation of any data points for some time during which the signals are blocked or degraded, while transmissions from other tags that remain unblocked may result in generation of data points during the same time interval. Each tag-level position estimate can include not only X and Y coordinates but also the time stamp of the most recently collected data point from which the position estimate was derived. If the time stamp indicates that the data point is older than the age threshold, then estimator 40 does not use the tag-level position estimate that was derived from it. Rather, estimator 40 combines (e.g., averages) only those tag-level position estimates that were derived from more recently collected data points. For example, with reference to FIG. 7, estimator 40 may discard or not use the tag-level position estimate for time 48 that was derived from the data point collection 46 if the most recently collected data point from which it was derived, i.e., the next data point to the left of time 48, is older than the predetermined threshold.

Figure 8:
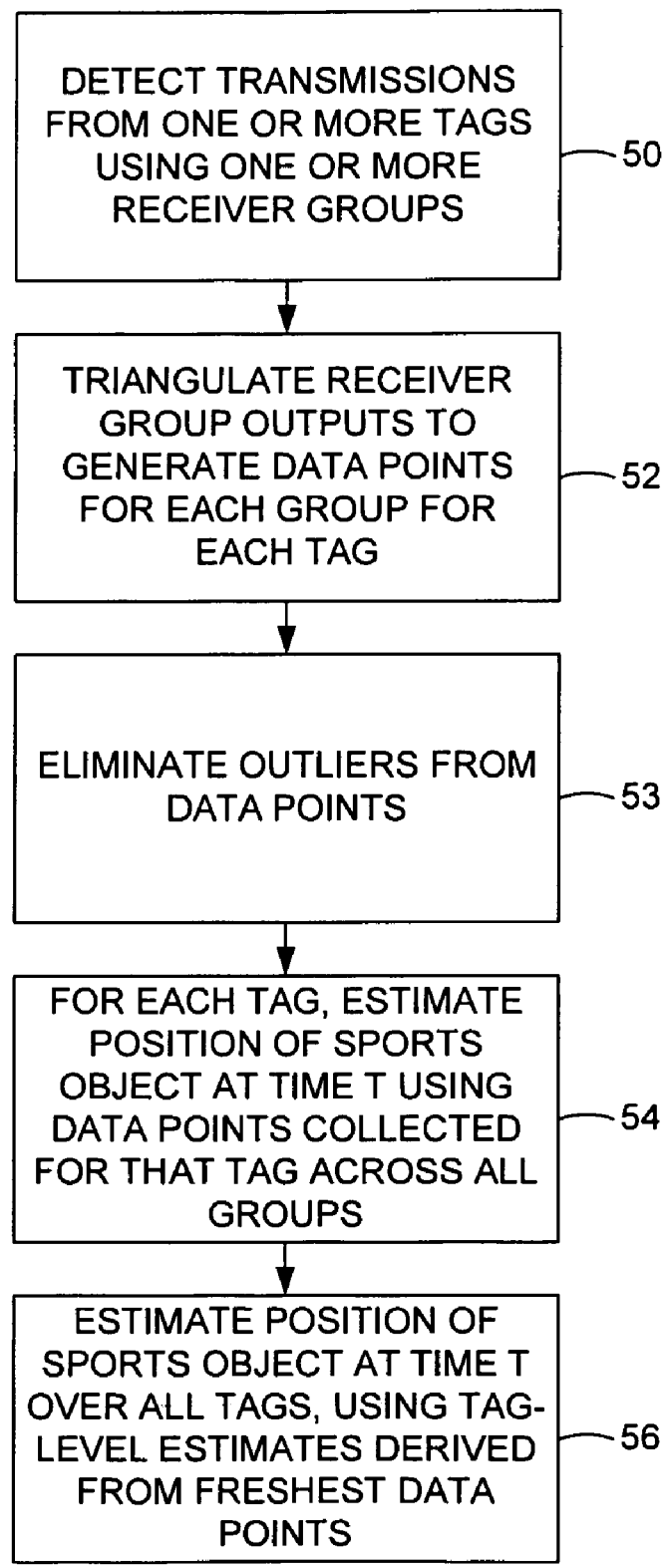
FIG. 8 is a flow diagram, illustrating a method for tracking sports objects in a playing area.

As illustrated in FIG. 8, an exemplary method for tracking sports object 14 can include steps 50, 52, 54 and 56, which reflect the operation of the system described above with regard to FIG. 6. As indicated by step 50, of the two or more receiver groups that listen for signals from tags, each receiver that is able to detect the information in a signal transmitted by a tag provides an output indicating the successful detection. If all receivers of a group indicate successful detection, the receiver group output is triangulated on a per-tag basis to produce one or more data points (i.e., one data point per receiver group per tag that the receivers of the group detect), as indicated by step 52. Note that more than one receiver group may generate a data point. Each data point represents an estimated position of a tag at the time the corresponding receiver group detected the signal transmitted by a tag. As indicated by step 54, a collection of data points (e.g., collected in a FIFO) is used to produce a tag-level position estimate for a time t. As part of generating a tag-level position estimate, a preliminary step 53 of performing outlier elimination can be performed in the conventional manner to eliminate outlier data points from the data point collection. As indicated by step 56, the tag-level position estimates are combined into an overall estimate of the position of the sports object. That is, if position estimates based upon signals detected from two or more tags are produced, they are combined (e.g., by averaging them). In step 56, data points that were not collected sufficiently recently can be omitted from the computation. Although steps 50-56 reflect estimating the position of sports object 14 at only a single point in time, they can be performed repeatedly in a looped manner to generate a sequence of estimates to thereby track the movement of sports object 14.

While one or more embodiments of the invention have been described as illustrative of or examples of the invention, it will be apparent to those of ordinary skill in the art that other embodiments and implementations are possible that are within the scope of the invention. Accordingly, the scope of the invention is not to be limited by such embodiments but rather is determined by the appended claims.

What is claimed is:

1. A method for tracking sports objects in a playing area, comprising:
    (a) selecting a first radio receiver group, the first radio receiver group comprising a first subset of at least three radio receivers selected from a totality of radio receivers, the totality of radio receivers distributed about the playing area, wherein each region of the playing area is within a radio reception range of at least three radio receivers;
    (b) selecting a second radio receiver group, the second radio receiver group comprising a second subset of at least three radio receivers selected from the totality of radio receivers, the second subset being different from the first subset;
    (c) the first radio receiver group receiving signals from one or more transmitter tags attached to a sports object;
    (d) the second radio receiver group receiving signals from the one or more transmitter tags attached to the sports object;
    (e) estimating a position of the sports object in response to the signals received by both the first radio receiver group and the second radio receiver group; and
    (f) repeatedly performing steps (a)-(e) to track movement of the sports object in the playing area over a time interval.

2. The method claimed in claim 1, wherein each radio receiver comprises an Ultra- Wideband (UWB) receiver, and each transmitter tag comprises a UWB transmitter.

3. The method claimed in claim 1, wherein the one or more transmitter tags attached to a sports object comprise a plurality of transmitter tags attached the sports object, and each transmitter tag of the plurality is attached to a different portion of the sports object.

4. The method claimed in claim 1, wherein the step (e) of estimating a position of the sports object in response to the signals received by both the first radio receiver group and the second radio receiver group comprises:
    generating a first tag-level estimate of the position of the sports object in response to the signals received from a first transmitter tag attached to the sports object by the first radio receiver group and in response to the signals received from the first transmitter tag by the second radio receiver group;

generating a second tag-level estimate of the position of the sports object in response to the signals received from a second transmitter tag attached to the sports object by the first radio receiver group and in response to the signals received from the second transmitter tag by the second radio receiver group; and generating an overall estimate of the position of the sports object in response to the first and second tag-level estimates.

5. The method claimed in claim 1, wherein the step (e) of estimating a position of the sports object in response to the signals received by both the first radio receiver group and the second radio receiver group comprises:

generating a plurality of data points, each data point corresponding to a detection of signals received from a transmitter tag, the plurality of data points corresponding to a sequence of signal detections made in response to signals received from the transmitter tag over a time interval; and estimating the position of the sports object in response to the plurality of data points.

6. The method claimed in claim 5, wherein the step of estimating the position of the sports object in response to the plurality of data points comprises performing an operation upon the plurality of data points, the operation selected from: interpolation; extrapolation; and averaging.

7. The method claimed in claim 5, further comprising eliminating outlier data points before the step of estimating the position of the sports object in response to the plurality of data points.

8. The method claimed in claim 5, wherein each data point includes a coordinate group identifying a position, and a time stamp identifying a time at which the data point was generated.

9. The method claimed in claim 5, wherein the step of estimating the position of the sports object in response to a plurality of data points omits data points corresponding to signals detected at a time longer ago than a predetermined threshold age but includes data points corresponding to signals detected at a time more recent than the predetermined threshold age.

10. The method claimed in claim 9, wherein:

the one or more transmitter tags attached to a sports object comprise a plurality of transmitter tags attached the sports object, and each transmitter tag of the plurality is attached to a different portion of the sports object;

all data points corresponding to detections of signals received from a first transmitter tag are omitted if the position of the sports object was estimated in response to any data points for which the corresponding signals were detected at a time longer ago than the predetermined threshold age; and all data points corresponding to detections of signals received from a second transmitter tag are included if the position of the sports object was estimated in response to only data points for which the corresponding signals were detected at a time more recent than the predetermined threshold age.

11. A system for tracking sports objects in a playing area, comprising:

one or more transmitter tags attachable to a sports object;

a plurality of radio receivers collectively defining a totality of radio receivers, the totality of radio receivers distributable about the playing area, wherein each region of the playing area is within a radio reception range of at least three radio receivers;

a controller that selects a plurality of radio receiver groups, each radio receiver group comprising a subset of at least three radio receivers selected from the totality of radio receivers, the subset of radio receivers of the selected radio receiver group being different from all other subsets of radio receivers of other selectable radio receiver groups, wherein each radio receiver of each selected radio receiver group receives signals from one or more transmitter tags attached to a sports object; and an estimator system that repeatedly estimates a position of the sports object in response to the signals received by each of the selected radio receiver groups to track movement of the sports object in the playing area over a time interval.

12. The system claimed in claim 11, wherein each radio receiver comprises an Ultra-Wideband (UWB) receiver, and each transmitter tag comprises a UWB transmitter.

13. The system claimed in claim 11, the estimator system comprises:

a first tag-level position estimator, the first tag-level position estimator generating a first tag-level estimate of the position of the sports object in response to the signals received from a first transmitter tag attached to the sports object by a first radio receiver group and in response to the signals received from the first transmitter tag by a second radio receiver group;

a second tag-level position estimator, the second tag-level position estimator generating a second estimate of the position of the sports object in response to the signals received from a second transmitter tag attached to the sports object by a first radio receiver group and in response to the signals received from the second transmitter tag by a second radio receiver group; and an overall position estimator, the overall position estimator generating an overall estimate of the position of the sports object in response to the first and second tag-level estimates.

14. The system claimed in claim 13, wherein the estimator system comprises:

a plurality of signal triangulators, each signal triangulator generating a plurality of data points, each data point corresponding to detection of signals received from a transmitter tag, the plurality of data points corresponding to a sequence of signal detections made in response to signals received from the transmitter tag over a time interval; and a data point collector system for storing data points.

15. The system claimed in claim 14, wherein each data point includes a coordinate group identifying a position and a time stamp identifying a time at which the data point was generated.

16. The system claimed in claim 15, wherein the estimator omits data points corresponding to signals detected at a time longer ago than a predetermined threshold age but includes data points corresponding to signals detected at a time more recent than the predetermined threshold age.

* * * * *